UNITED STATES PATENT OFFICE.

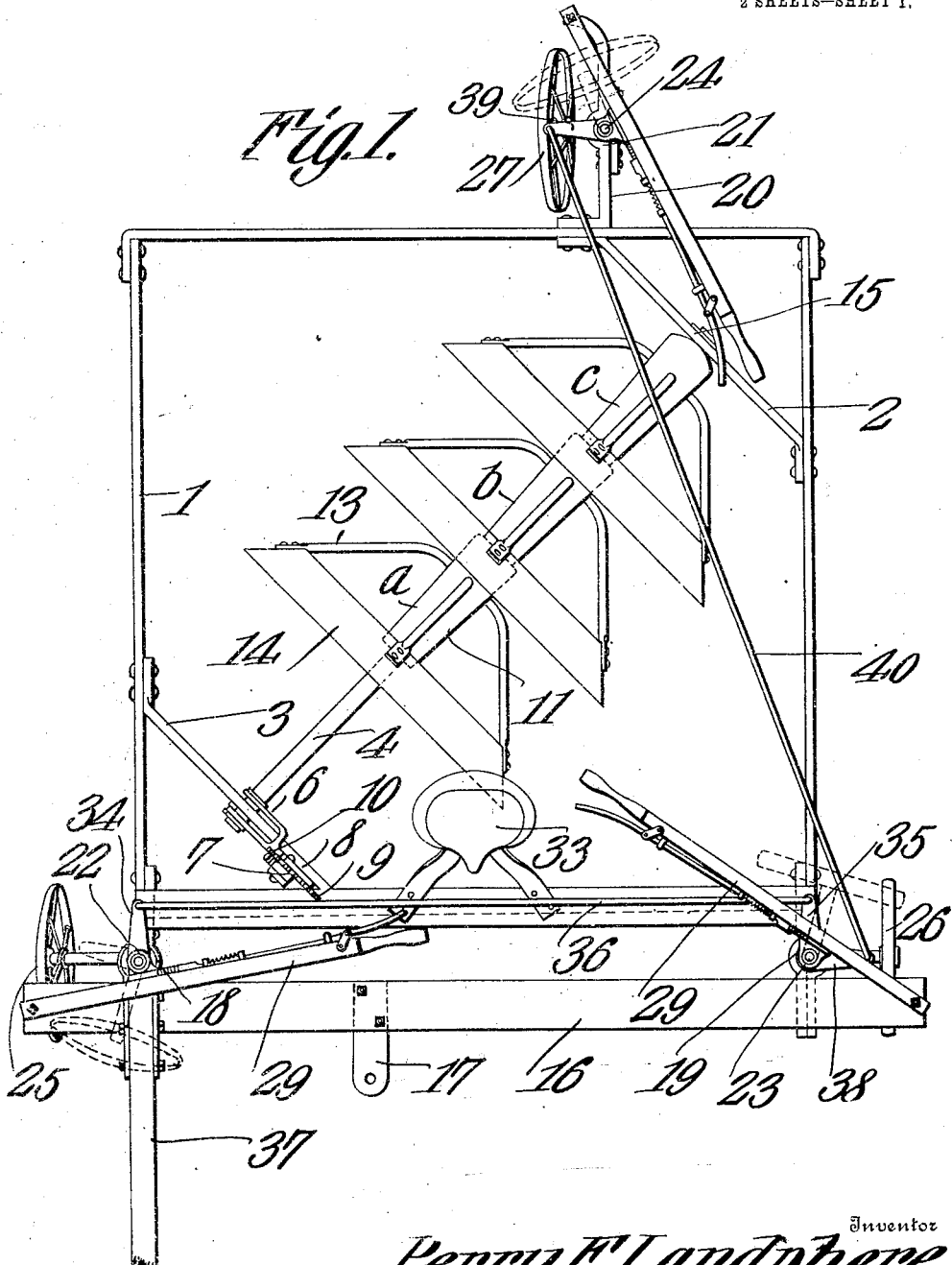

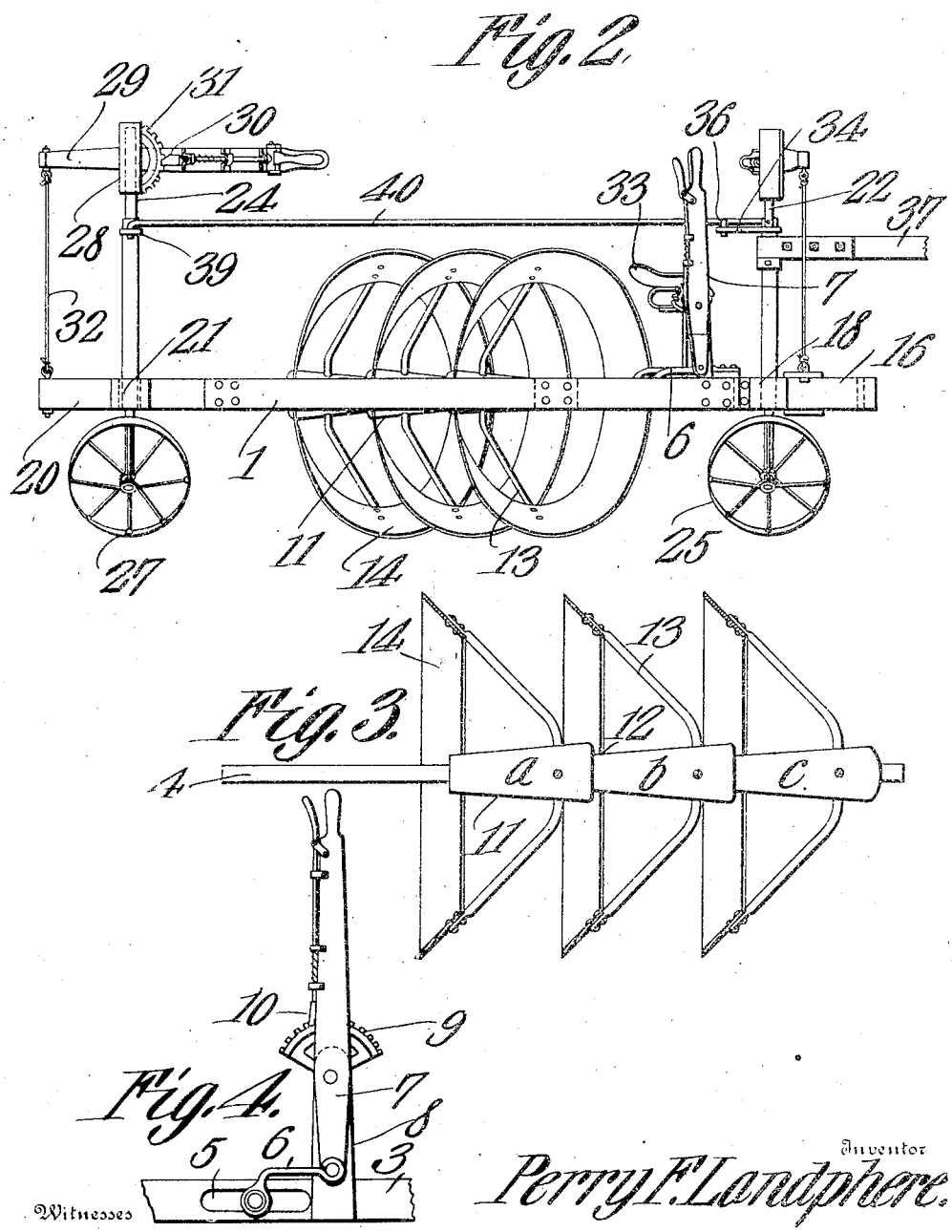

PERRY F. LANDPHERE, OF MAZON, ILLINOIS.

ROTARY PLOW.

No. 910,293.  Specification of Letters Patent.  Patented Jan. 19, 1909.

Application filed March 16, 1908. Serial No. 421,363.

*To all whom it may concern:*

Be it known that I, PERRY F. LANDPHERE, a citizen of the United States, residing at Mazon, in the county of Grundy and State of Illinois, have invented a new and useful Rotary Plow, of which the following is a specification.

This invention has relation to rotary plows and it consists in the novel construction and arrangement of its parts as hereinafter shown and described.

The object of the invention is to provide a plow with a series of rotary plowing members so mounted in the frame that as the plow is turned the pivotal point of the plow as an entirety will occur at the edge of one of the rotary members which is in contact with the ground thereby reducing the frictional contact of the said rotary members with the soil during the act of turning the plow.

A further object of the invention is to provide a plow of the character indicated which is of special and durable construction.

In the accompanying drawings: Figure 1 is a top plan view of the plow. Fig. 2 is a side elevation of the same. Fig. 3 is a sectional view of the rotary plowing members, and Fig. 4 is an elevation of a lever mechanism used for shifting the shaft upon which the rotary plow members are mounted.

The plow consists of the rectangular frame 1 which is preferably square or the frame may be circular. The frame 1 is provided at opposite corner portions with the parallel pieces 2 and 3 which are diagonally disposed with relation to the frame. The shaft 4 is journaled at one end in the piece 2 and at its opposite end is located in the elongated opening 5 provided in the piece 3. The link 6 is pivotally connected at one end with the shaft 4 and at its opposite end is pivoted to the lever 7 which is fulcrumed upon an upright 8 attached to the piece 3. Said upright is provided with a gear segment 9 which is adapted to be engaged by the pawl 10 carried by the lever 7. The hub 11 is mounted upon the shaft 4 and is divided along its length by a series of transverse reductions 12 into sections *a*, *b*, and *c*. The spokes 13 are attached to the said sections in the vicinity of the ends thereof of greater transverse dimensions. The spokes upon each section converge at an angle toward each other and toward the axis of the shaft 4. That is to say, the said spokes do not occupy the same plane at a right angle to the axis of the shaft 4. The outer ends of each set of spokes 13 are connected together by a rim 14 and the said rim is substantially of concaved configuration which concavity is generally followed by the dispositions of each set of spokes. The rear end of the hub 11 is rounded as at 15 and bears against the strip 2.

The forward portion of the frame 1 is provided with an extension 16 to which is attached the lug 17. The draft animals are hitched to the lug 17. The frame 1 is provided at its forward corners with the journal boxes 18 and 19 and at its rear side with a bracket 20 which is provided with a journal box 21. The bearings in the said boxes 18, 19 and 21 are vertically disposed and the spindle shanks 22, 23 and 24 are journaled in the said boxes respectively. The ground wheels 25, 26 and 27 are journaled upon the spindles of the said respective shanks. A hood 28 is journaled upon the upper end of each of the shanks 22, 23 and 24 and a lever 29 is fulcrumed to each hood and is provided with a pawl 30 adapted to engage a gear segment 31 also mounted upon the hood. A link 32 connects the working end of the levers 29 with the frame 1 or an extension thereof. By means of the said levers 29 the front or rear portions of the frame 1 may be raised or lowered or either of the forward corners of the said frame may be relatively raised or lowered. The seat 33 is mounted upon the forward portion of the frame 1 and the power ends of the forward levers 29 are within convenient reach of one who occupies the said seat. The arm 34 is fixed to the shank 22 and the arm 35 is fixed to the shank 23. The connecting rod 36 is pivotally attached at its ends to the said arms. The guiding tongue 37 is fixed at its rear end to the shank 22. The arm 38 is fixed to the shank 23 and is disposed substantially at a right angle to the arm 35. The arm 39 is fixed to the shank 24 and the connecting rod 40 is pivotally attached at its ends to the arms 38 and 39.

The shaft 4 is diagonally disposed with relation to the frame 1 and the lowest portion of the rim 14 of the intermediate rotary plowing member is normally located at a point below the center of the frame 1. It will therefore be seen that when the guiding tongue 37 is swung horizontally that the wheels 25 and 26 will be turned in parallel relation while the wheel 27 will be turned in an opposite direction. This is due to the fact that the arm 39 lies upon the opposite side of the shank 24 from that side in which the arm 38 extends from the shank 23. Thus during the act of turning the frame 1 is swung around upon a point occurring substantially at its center and as the lowest part of the rim 14 of the intermediate plowing member is located in vertical alinement with this point the turning of the plow is virtually accomplished upon the lowest point of the rim 14 of the intermediate plowing member as a pivot. This peculiar relation of the plowing members with the ground wheels materially reduces the frictional contact with the soil during the act of turning the implement. By adjusting the forward end of the shaft 4 through the instrumentality of the lever 7 the soil engaging edges of the rim 14 may be adjusted to a nicety with relation to the soil or line of draft so as to effectively turn the soil and to meet the conditions thereof.

Having described my invention, what I claim as new and desire to secure by Letters Patent is:—

A plow comprising a frame, castered wheels supporting the frame, means connecting all of the wheels together whereby they are caused to swing into different planes simultaneously, a guiding tongue connected with one of the wheels, a shaft journaled upon the frame and lying at an oblique angle to the line of draft, said shaft having its rear end in a fixed bearing, means for horizontally adjusting the forward end of the shaft, a plowing member mounted upon the shaft and having its lowest point approximately located in vertical alinement with the axis upon which the frame rotates in making a turn and plowing members mounted upon the shaft at the opposite sides of the first said member and at equal distances therefrom.

In testimony that I claim the foregoing as my own, I have hereto affixed my signature in the presence of two witnesses.

PERRY F. LANDPHERE.

Witnesses:
MICHAEL DIEBOLD,
C. W. ROCKAFELLAR.